United States Patent [19]

Taylor

[11] Patent Number: 5,005,846
[45] Date of Patent: Apr. 9, 1991

[54] JET SKI TRANSPORTER CARRIAGE AND RELATED METHODS

[76] Inventor: Keven Taylor, 3672 Ridgecrest Dr., Salt Lake City, Utah 84118

[21] Appl. No.: 421,865

[22] Filed: Oct. 16, 1989

[51] Int. Cl.⁵ .............................. B60F 5/00; B62B 3/02
[52] U.S. Cl. .................................... 280/30; 280/47.34; 280/79.6; 280/414.2; 114/344; 224/42.32
[58] Field of Search ................... 280/30, 32, 35, 414.2, 280/415.1, 656, 87.021, 79.6, 79.7, 47.34; 114/344; 296/3, 4; 224/310, 326, 42.01, 42.32, 42.45 R

[56] References Cited

U.S. PATENT DOCUMENTS

| | | | |
|---|---|---|---|
| 415,430 | 11/1889 | Abresch | 296/4 |
| 454,174 | 6/1891 | Martin et al. | 280/30 |
| 2,536,561 | 1/1951 | Mickam | 280/79.6 X |
| 3,063,667 | 11/1962 | Doty, Jr. et al. | 280/30 X |
| 3,159,853 | 12/1964 | Chesack | 114/344 |
| 3,503,620 | 3/1970 | Koskovich et al. | 280/415.1 X |
| 3,709,413 | 1/1973 | Nelson | 224/310 |
| 3,912,139 | 10/1975 | Bowman | 224/42.45 R X |
| 4,199,186 | 4/1980 | Faverino | 296/3 X |
| 4,723,451 | 2/1988 | Ishimatsu | 114/344 X |
| 4,960,356 | 10/1990 | Wrenn | 414/462 X |

FOREIGN PATENT DOCUMENTS

| | | | |
|---|---|---|---|
| 1211524 | 3/1960 | France | 280/656 |
| 8402504 | 7/1984 | PCT Int'l Appl. | 114/344 |

Primary Examiner—David M. Mitchell
Assistant Examiner—Brian L. Johnson
Attorney, Agent, or Firm—Lynn G. Foster

[57] ABSTRACT

A transporter carriage upon which a jet ski is securely placed and related methods. The transporter carriage comprises rails forming part of a framework, the rails being shaped to compatibly receive the jet ski, and releasibly interchangeable support systems which provide carriage support and mobility.

48 Claims, 4 Drawing Sheets

JET SKI TRANSPORTER CARRIAGE AND RELATED METHODS

FIELD OF INVENTION

This invention relates generally to ground transportation of land immobile water craft and, more particularly, to transportation upon, loading, and unloading of jet skis to and from common personal vehicles now in use, i.e. pickup trucks, trailers, and the like.

PRIOR ART

Jet skis are relatively new recreational vehicles. They are compact and two or more can be loaded for transport into the bed of a pickup truck or upon a trailer. The most common practice is to bring the jet ski from home or its other place of storage to water for each recreational event. In the water, they are mobile and maneuverable. However, out of the water, the jet ski by itself is immobile, too heavy and awkward to be loaded, unloaded, or even lifted by a single person.

If improperly secured in a moving vehicle, the position of a ski jet can shift, resulting in damage when the jet ski collides with other equipment within the truck bed or trailer. Because the cost of jet skis currently numbers in the thousands of dollars and the operation of a damaged, unsafe jet ski could be life threatening, it is prudent to transport the jet skis in protective carriers.

BRIEF SUMMARY AND OBJECTS OF THE INVENTION

In brief summary the present invention is intended to overcome or substantially alleviate the problems of the past in respect to loading, unloading and ground transportation of a jet ski and comprise a transport carriage upon which the jet ski is securely placed and related methods. Preferably, the transport carriage comprises rail structure shaped to compatibly receive the jet ski.

One person can load or unload the united combination of the jet ski and carriage from a truck, trailer, or the like. The combination, so unloaded, is mobile and can be ground displaced to and into the water for a floatable launch or the like. An individual can also retrieve the jet ski, while buoyant in the water, and affix it to the carriage at the water's edge. From there, the person can wheel the combination from the water and along the ground to the transporting vehicle, place the combination upon the vehicle, and secure the combination for stable ground travel. Mounting and securing a jet ski on the carriage thus provides safe, stable transportation for jet skis.

It is a primary object of this invention to provide an inexpensive solution to the aforesaid problems.

It is another paramount object to provide a novel carriage, and related methods upon which a jet ski is mounted for ground displacement from place to place.

It is a further important object to provide a novel jet ski carriage for safely and stably transporting the jet ski in a pickup truck, a trailer, or the like along the ground from place to place.

It is another dominant object to provide a novel carriage which is immovably combined with a jet ski for unitary loading and unloading upon and ground transportation with a motorized vehicle.

It is an additional significant object to provide a novel carriage which is immovably combined with a jet ski for wheeled displacement to and from a body of water.

It is also a primary object to provide carriages which can be used separately or in combinations, each with a jet ski.

These and other objects and features of the present invention will be apparent from the detailed description taken with reference to the accompanying drawings.

DETAILED DESCRIPTION OF THE ILLUSTRATED EMBODIMENT

Figure 1:
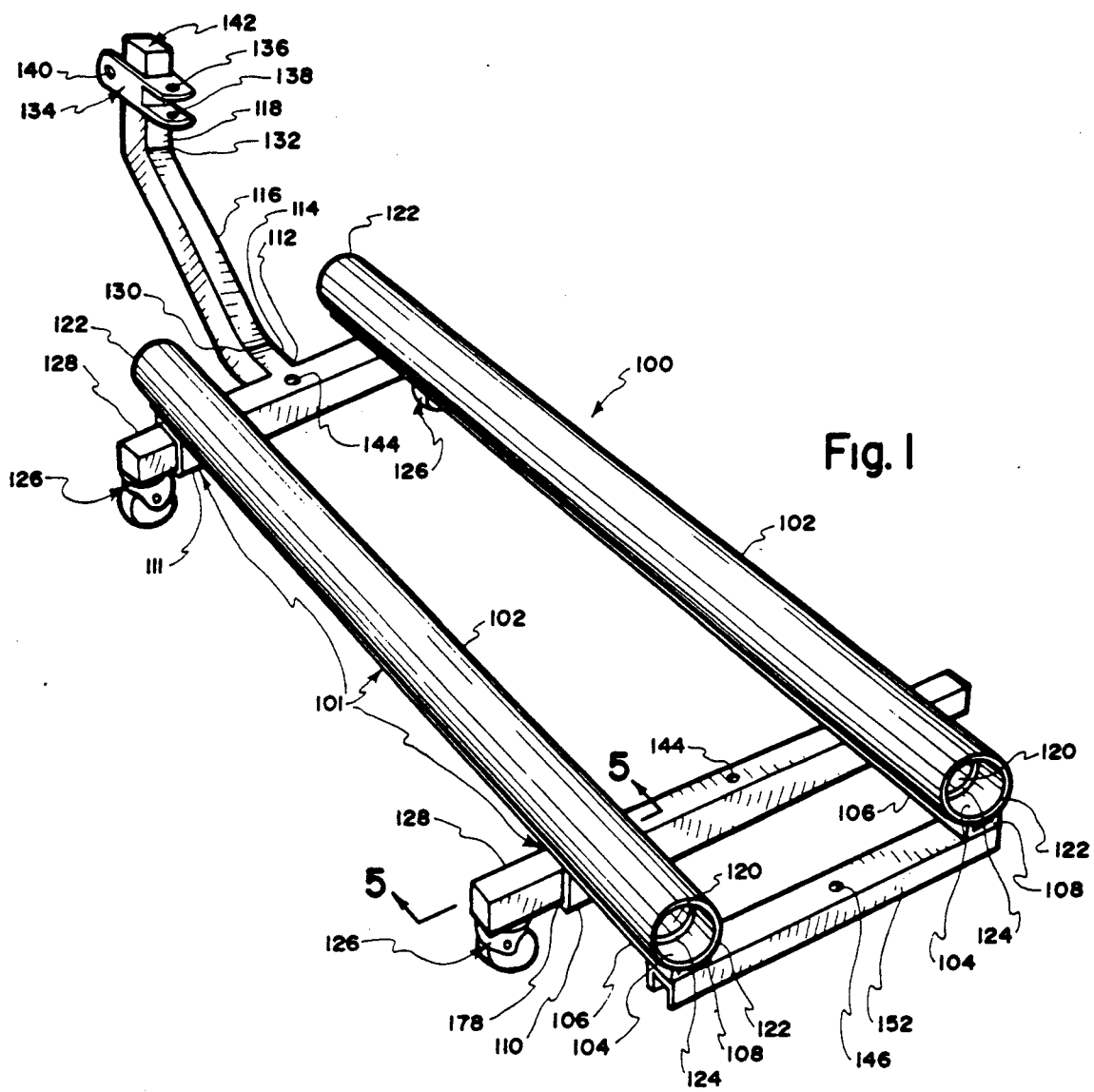
FIG. 1 is a perspective of a present preferred embodiment of a jet ski transportation carriage, shown in unoccupied condition.

Reference is now made in detail to the drawings wherein like numerals are used to designate the same parts throughout. An overview of the presently preferred embodiment of the invention and its use is provided by a review of FIGS. 1, 2, and 3. Specifically, a jet ski transporter carriage, generally designated carriage 100, is shown unoccupied in FIG. 1, and comprises two tubular members or longitudinal rails 102 longitudinal rails upon which a jet ski is adapted to rest during storage, loading, unloading and ground transport. The tubular members 102 comprise part of a supporting framework. The framework 101 also comprises a steel "U" shaped bar stock structural member 152 which is welded to bracing cross members 110, 111, and 152. Centrally, extending from and integrally connected to the front cross brace 111 is an angular shaped tongue 116, which turns through two angles in a forward and upward direction to ultimately provide a vertical support 118 for a clevis 134, used to attach the front end of a jet ski to the carriage 100, as hereinafter explained in greater detail.

Hole 146, located in the center of the rear cross brace 152, is similarly used to anchor the rear of a jet ski to the carriage 100, as hereinafter explained in greater detail. In the configuration shown in FIG. 1, caster support assemblies 126 have been removably added to each end of the cross members 110 and 111 to movably support the carriage 100 above the ground for improved mobility.

Figure 2:
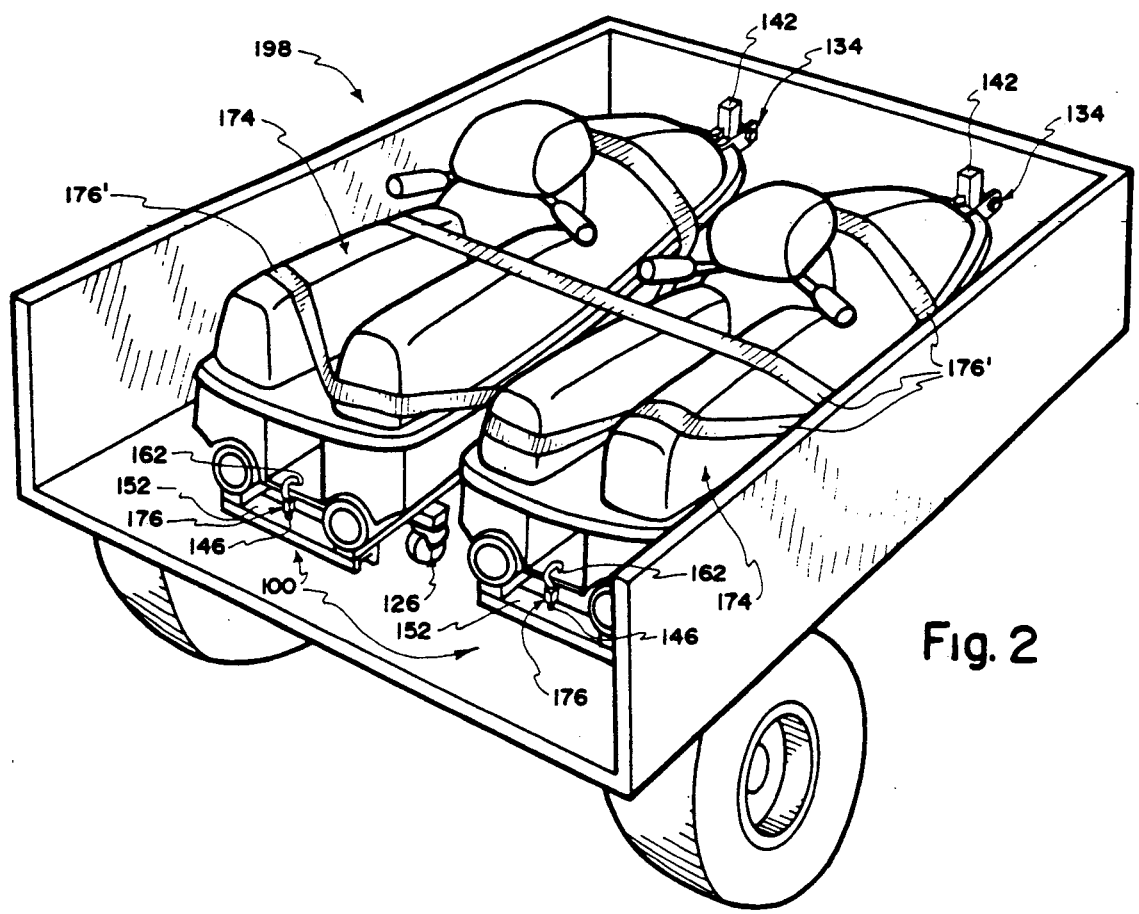
FIG. 2 is a perspective of two jet ski transportation carriages, each with a jet ski secured thereto, all placed in on a flat-bed trailer.

FIG. 2 is a view of trailer assembly 198, showing two carriages 100 loaded in a trailer with a jet ski 174 disposed upon each carriage 100. The diameter of the longitudinal rails is selected to be compatible with the undercarriage of the jet ski. Each jet ski 174 is anchored to the carriage 100 with which it is associated by clevis assembly 134 (FIG. 1) in the front and hook-turnbuckle assembly 176 (FIG. 6) with which it is associated in the rear, both of which will be described in detail later. The carriage 100 improves vertical, longitudinal, lateral, and rotational stability of the associated jet ski 174 for ground shipment as well as loading, unloading and storage.

Each jet ski 174 is shown secured in a vehicle trailer 198 in FIG. 2 by three straps 176' to constrain the units from movement during ground travel or travel aboard another carrier (e.g. water or aircraft). However, lateral and longitudinal restraint can be achieved by any suitable stabilizer, such as currently available commercial restraints used for motor bikes and snowmobiles.

An alternative means for securing the ski jet 176 and carriage 100 combination for subsequent transportation in a trailer 198 can be achieved by taking advantage of the removability of the caster support assemblies 126. In this case, each caster support assembly 126 is slideably removed one at a time until the carriage 100 is brought to rest on its structural frame cross members 110, 111, and 152 on the bed of trailer 198. Once cross members 110, 111, and 152 are in contact with the bed of the trailer, the combination carriage 100 and ski jet 174 is slidably moved until mounting nuts in the bed of the trailer (not shown) are juxtaposed with holes 144 in cross members 110 and 111. Bolts are then inserted through holes 144 and tightened to secure the ski jet 174 for travel.

Figure 3:
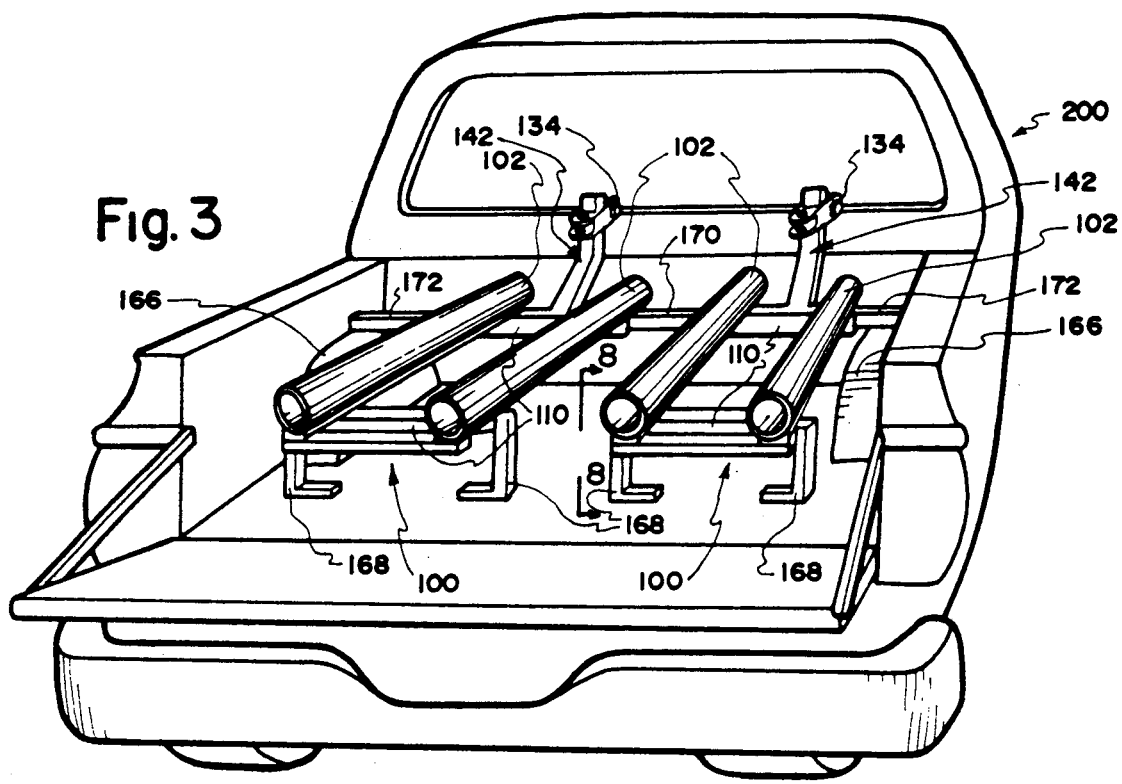
FIG. 3 is a perspective of two unoccupied jet ski carriages, in a pickup truck bed.
Figure 8:
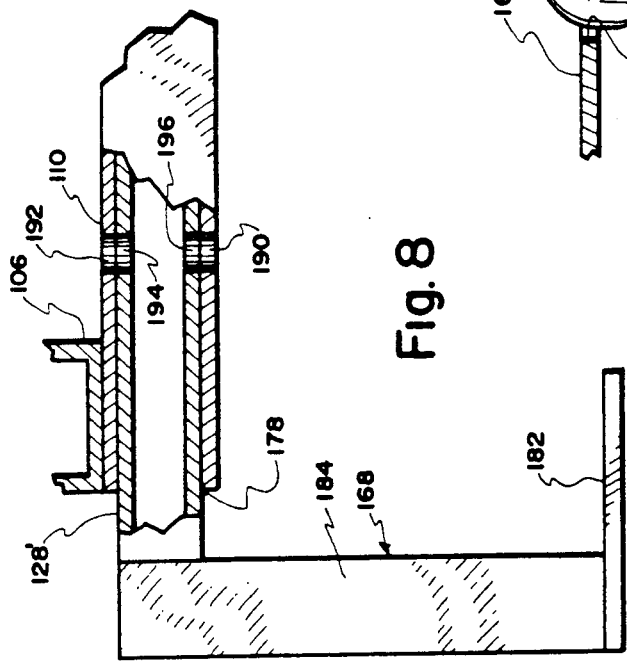
FIG. 8 is an enlarged elevation taken along lines 8—8 of FIG. 3, with parts taken away for clarity.

A pedestal support assembly embodiment used to mount two jet skis in the bed of a pickup truck 200 is shown in FIG. 3. In this configuration, the caster support assemblies 126 at the front and rear of the carriage 100 of FIGS. 1 and 2 are removed. The rear caster assemblies are replaced by removable pedestal support assemblies 168. See FIG. 8. External horizontal support members 172 which rest on the truck wheel wells 166 replace the outside caster assembly at the front of each carriage 100. See FIG. 9. The interior front caster support assembly 126 of each carriage 100 is replaced by a common bridging support assembly 170 mounted across the gap between the two front cross braces 111, providing bridging support. See FIG. 3. Other configurations, such as one where larger diameter wheel support assemblies are used in lieu of the caster support assemblies for transport across rough terrain, are within the scope of the present invention.

Each of the support assemblies, e.g. pedestal, caster, and wheel, can be unlatched, slidably removed, and replaced. This ease of replacement allows one person to focilely change the support configuration from one support assembly to another at any desired point in time. Thus, a carriage 100 comprising pedestal support 168 in combination with a jet ski 174 can be converted to one which rolls on casters or wheels by removing each pedestal support assembly 168, and replacing it in turn with a wheel assembly such as caster support assembly 126. The mobility afforded by caster or wheel support assemblies allows the jet ski, which loaded with a carriage 100, to be moved from the ground vehicle and into the water by a single person. Once in the water, the jet ski can be easily floatably uncoupled from the carriage 100.

In like manner, the jet ski can be returned to its unified relation with the carriage 100 while in the water at the edge of the lake and the like, secured, and wheeled to the ground transport vehicle. If desired, the carriage 100 can be reconfigured for travel by replacing the wheel support assemblies as described above.

Referring to FIG. 1, the carriage 100 is shown unoccupied with caster support assemblies 126 mounted at four locations to provide mobility over a relatively smooth surface and/or terrain. Two parallel tubular members or rails 102 provide support on which the jet ski is unitarily carried. Each tubular member is constructed of external tubes 102 of suitable synthetic resinous material, such as polyvinyl. As presently preferred, a steel tube 120 is inserted snugly into each tube 102 to achieve adequate structural strength, the inner diameter of the polyvinyl tubes preferably being essentially the same as the outer diameter of the steel tubes. Each assembly of tube 102/120 may be held against relative movement by an interference fit, by adhesive or both. Preferably, the steel tubes 120 are cut into lengths slightly shorter than the polyvinyl tubes 102 and inserted and positioned such that each end 124 of the steel tubes is recessed inside the end 122 of the polyvinyl tubes 102. The recess between each end of each polyvinyl tube 102 and the associated steel reinforcing tube 120 provides a safety margin, assuring the sharp edges of the steel tube 120 are not exposed beyond the protective polyvinyl tube 102.

Figure 5:
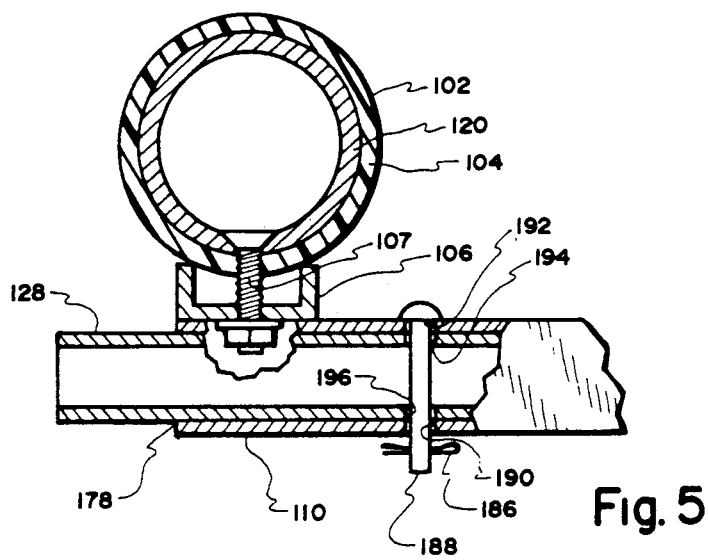
FIG. 5 is an enlarged cross section taken along line 5—5 of FIG. 1.

Each tube assembly 102/120 is laid into the "U" shaped cavity of channel-shaped structural member 106 and affixed to it by two countersunk bolt assemblies 107 which pass through aligned apertures in member 106, tube 102, and tube 120. See FIG. 5.

The channels 106 of the carriage 100 form part of a framework which comprises three rigidly affixed cross braces 110, 111, and 152. Presently it is preferred that the channels 106 and cross members 110, 111, and 152 be welded together. The rearmost cross member 152 is illustrated as being made from the same channel shaped bar stock as structural member 106, but is inverted, orthogonally positioned between the two channel members 106 and welded base to base as shown in FIG. 1. Rearmost cross member 152, second cross member 110, and third cross member 111 are separately disposed rear to front. Members 110 and 111 are illustrated as being formed of hollow rectangular bar stock. See FIG. 1. Cross braces 110 and 111 are positioned relative to each other and to the center of gravity so that weight distribution of the jet ski load is longitudinally stable. Cross brace length is sufficient for vertical stability. Cross braces 110 and 111 are longitudinally positioned to provide wheel, castor, and pedestal support placement consistent with the requirement that the shape and location of the rails 102 be congruent with the size and shape of the jet ski.

The tongue assembly is integrally joined centrally and horizontally to the forward surface of cross brace 111 at site 112. Tongue assembly 142 is illustrated as formed of the same hollow rectangular bar stock used to form cross members 110 and 111. The tongue assembly 142 is formed to be compatible with the bow of a jet ski. Tongue assembly section 114 extends forward in the same horizontal plane as contains cross member 111 to position 130 where it is illustrated as being bent upward through an angle of approximately 15 degrees with the horizontal, extending therefrom to position or site 132 where it is bent the complementary 75 degrees to provide a vertically erect frame support section 118, onto which a clevis 134 is mounted.

Figure 7:
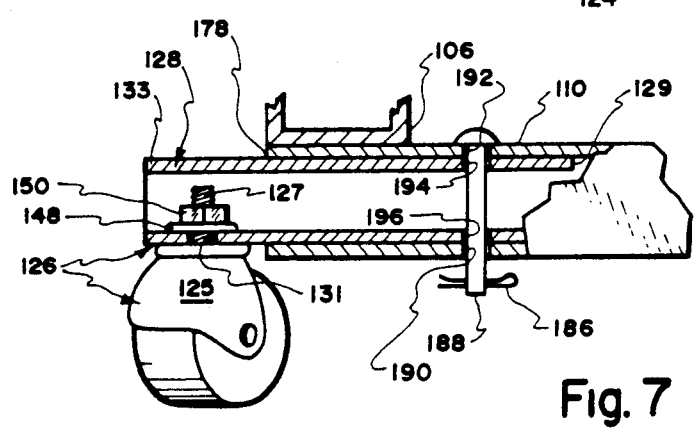
FIG. 7 is a cross section, similar to FIG. 5, showing details of caster mounting.

The rectangular inside and outside end orifices of cross members 110 and 111 provide access to different support members or assemblies. In FIG. 1, insertible caster assemblies 126 are shown as comprising a cantilever bar 128 removably inserted through orifice 178 into the hollow cavity at both ends of cross braces 110 and 111. Reference is made to FIG. 7 for details of positioning and securing caster assembly 126 in the open end of each cross brace 110 and 111. Each caster assembly 126 comprises the hallow bar 128 (FIG. 7) which has a rectangular or square cross section such that the free end 129 thereof may be snugly telescopically inserted into one open orifice 178 of cross member 110 or 111. Said end 129 is slidably displaced through orifice 178 until alignment of holes 190, 192, 194, and 196 is achieved. See FIG. 7. Cotter pin 188 is then inserted through said aligned holes and locked by cotter key 186.

Each caster assembly 126 comprises a caster 125 comprising a threaded stud 127. Threaded stud 127 projects through an aperture 131 in the exposed end 133 of the cantilevered bar 128. The caster 125 is releasibly held in the installed position of FIG. 7 by a nut 150 superimposed over a washer 148 and threaded and tightened upon stud 127. Removal of any caster assembly 126 involves removal of cotter key 186 and pin 188 and slidable withdrawal of the bar 128 from orifice 178 of cross braces 110, 111. Referring again to FIG. 1, utility holes 144 in cross beams 110 and 111 are illustrated as being unused; however, said holes 144 may be used to receive bolt assembly by which the frame is releasibly anchored to a vehicle, if desired. Utility hole 146 serves to anchor the rear of the jet ski to the carriage 100 as later herein described, in conjunction with FIG. 6.

Figure 4:
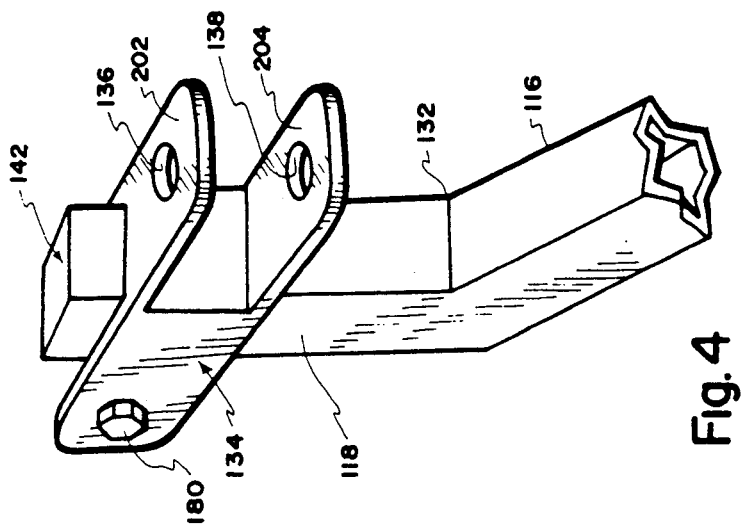
FIG. 4 is an enlarged fragmentary perspective of the vertical end of the tongue of the carriage of FIG. 1, showing a clevis by which the jet ski carriage is attached to the front end of a jet ski.

Two jet skis 174, mounted ready for travel in trailer assembly 198, are shown in FIG. 2. At the frontmost section of each carriage 100 on tongue 142, is carried one clevis 134 which is placed over vertical tongue section 118, in the selected position so that a mooring hole in the front lip of the associated jet ski 174 is between and in alignment with holes 136 and 138 of the clevis 134. Details of the clevis 134 and vertical post 118 of the tongue assembly 142 are best shown in FIGS. 1 and 4. The clevis 134 accommodates being raised or lowered to match the mooring hole of the associated jet ski 174 when bolt 180 is loose. When the desired position along tongue section 118 is attained, the bolt 180 is tightened. To moor the jet ski 174 to clevis 134, the lip containing the mooring hole of jet ski 174 is placed between clevis plates 202 and 204 so that the positions of holes 136 and 138 are releasibly aligned with the mooring hole of the jet ski, following which a retaining pin, bolt or the like is inserted.

Figure 6:
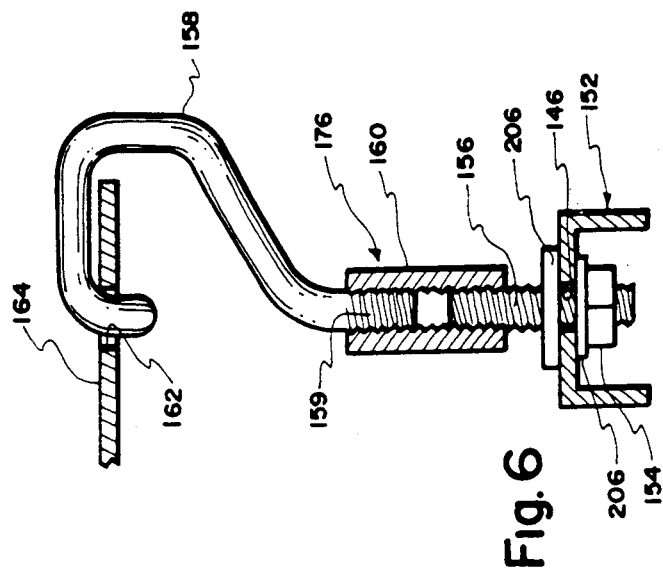
FIG. 6 is a cross section of a turnbuckle by which the rear of a jet ski is secured to a transporter carriage.

The rear of each jet ski 174 is also preferably releasibly secured to its associated carriage 100. FIGS. 2 and 6 show this being accomplished by use of a turnbuckle 176. The rear lip 164 of jet ski 174 is shown in cross section in FIG. 6. Lip 164 comprises anchor hole 162. Into central hole 146 of cross brace 152 screw thread shaft 156 of turnbuckle is extended. Washers 206 and bolts 154 are placed on threads upon shaft 156 above and below hole 146. Hook 158 is placed in anchor hole 162 and the threaded end 159 is turned from the top into internally threaded collar 160. Turnbuckle collar 160 is rotated in one direction until rear of jet ski 174 is tightly cinched to carriage 100 at cross brace 152. Opposite rotation loosens the turnbuckle when separation of the carriage 100 from its associated jet ski is desired.

While other ways may be used to restrict lateral and vertical relative movement of the jet ski 174 in respect to the carriage 100 while in transit and during loading and unloading, FIG. 2 shows the presently preferred mode by which a unified combination of a jet ski and a carriage 100 is releasibly secured to a trailer, i.e. by using one or more associated straps 176' which are conventionally interposed between said combination and the truck.

A different support system is illustrated in FIG. 3. Two unoccupied carriages 100 are shown side-by-side in the bed of a truck 200, each supported in the rear by two pedestal assemblies 168. A more detailed view of one presently preferred pedestal assembly 168 is provided in FIG. 8. A slidably removable cantilevered beam 128' is preferably welded to a pedestal post 184 which is welded to foot 182. The cantilevered beam 128' is hollow and of square or rectangular cross section, sized to be snugly telescopically received at selected open ends of cross member 110. The pedestal assembly is mounted by sliding the free end of cantilevered beam 128' through orifice 178 until holes 190, 192, 194, and 196 are in vertical alignment. See FIG. 8. A cotter pin (not shown) is then inserted through the aligned holes to releasibly lock the pedestal assembly in place. The height of the pedestal post is selected to essentially horizontally position the carriage 100, independent of the site of use.

Figure 9:
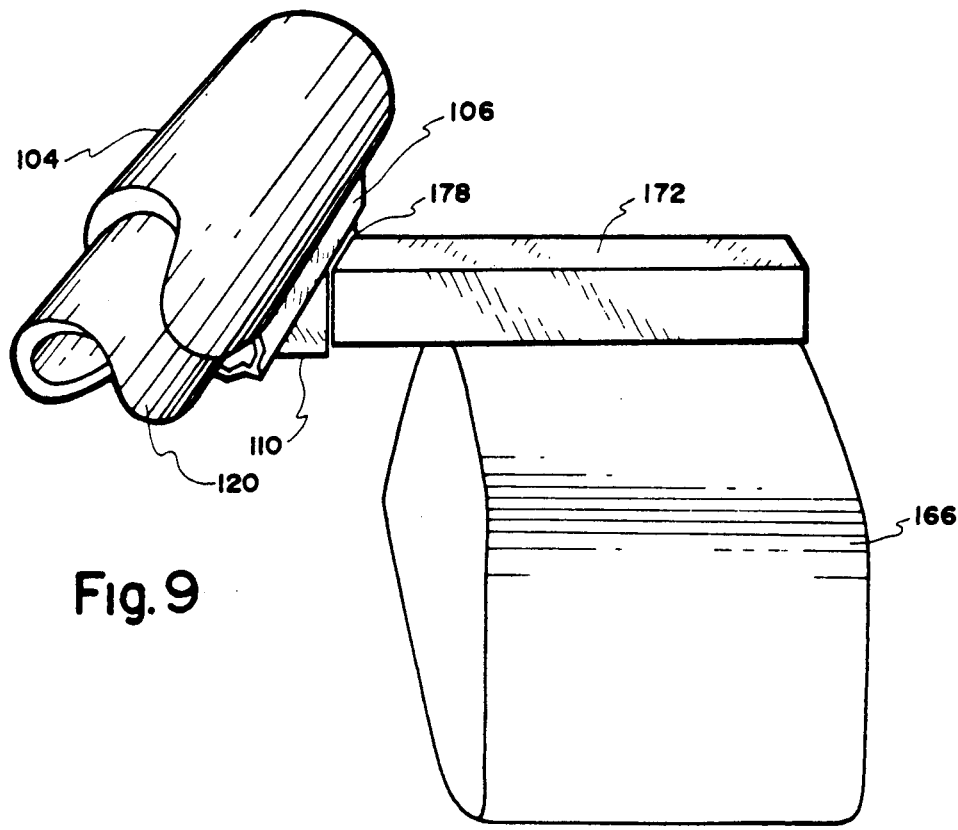
FIG. 9 is an enlarged fragmentary perspective of the support structure of two carriages by which they are caused to rest upon the metal forming the wheel wells of a pickup truck.

The front of the carriage 100 may be supported in the bed of the pickup truck by a cross piece system which takes advantages of the geometry of the pickup truck. See FIG. 3. Horizontal framework extending cross pieces 172 are inserted into the outside orifices 178 of each cross brace 111 so as to extend outward a sufficient distance to rest on the bed structure which forms each wheel well 166 of the truck 200. Detail of the horizontal support assembly 172 resting on the wheel well 166 is shown in FIG. 9. A central bridging support cross piece 170 spans removably between the two carriages 100, the cross piece 170 being telescopically inserted into the medial orifices 178 of both cross braces 111.

Four pedestals may be used to support any carriage 100 when in storage, either within or without a jet ski mounted thereon.

One person can load or unload the united combination of the jet ski 174 and carriage 100 from a truck, trailer, or the like. To unload the combination alone, said person can remove any restraining straps 176' or the like, move the combination until the rear caster support assemblies 126 or other wheel assemblies are just off the bed of the carrier, and then slidably pull the combination from the bed of the carrier, while lowering the trailing end of the combination until the rear of the combination is angularly disposed between and in contact with the bed of the carrier and the ground or other surface upon which the carrier rests. In this position the front caster support assemblies 126 or other wheel assemblies lie on the rear lip of the carrier bed. Said person can then lift the front of the combination while moving it rearward to clear the carrier bed and then lower the front of the combination until the front caster support assemblies 126 or other wheel assemblies are in contact with the ground or the like. The combination, so unloaded, is mobile and can be manually ground, or the like, displaced to and into the water for a floatable launch or the like or placed in a garage or the like for storage.

An individual can also retrieve the jet ski 174, while buoyant in the water, and affix it to the carriage 100 at the waters edge. From there, said individual can manually wheel the combination from the water and along the ground or like surface to the transporting vehicle. Having moved the combination to a ground position such that the front of the combination is juxtaposed with the opening of the bed of the vehicle, said individual can lift the front portion of the combination until its front caster support assemblies 126 or other wheel assemblies just clear the rear edge of the bed of the carrier 100 and then move it forward until the caster support assemblies 126 or other wheel assemblies can be lowered to rest on the rear lip of the carrier bed. Said individual can move to the rear of combination and can slidably lift and push the rear of the combination until the rear caster support assemblies 126 or other wheel assemblies reach the lip of the carrier bed, then lift and push the combination forward until the caster support assemblies 126 or other wheel assemblies clear the lip of carrier bed, where it can be lowered and moved into storage position in the bed of the vehicle. Said individual can then secure the combination to the vehicle in any known suitable way for stable ground travel. Mounting and securing a jet ski 174 on the carriage 100 thus provides both manual and vehicle transportation for jet skis 174 in a safe and stable way and for storage of the combination when and as desired.

In the water, the carriage and jet ski are together as a unit which prevents scratching of the bottom of the jet ski. Also the carriage can be placed on two or four pedestals so that the buoyancy of the jet ski cannot separate it from the carriage, which would also cause abrasion to the bottom of the jet ski.

The following are the material dimensions and specifications of a successfully produced and tested model or prototype jet ski 174 transporter carriage 100, submitted by way of example and not by way of limitation upon the invention:

| Item | number | material | dimensions | |
|---|---|---|---|---|
| Polyvinyl tubing | 104 | polyvinyl | OD: | 2⅜ in. |
| | | | Wall: | 3/16 in. |
| | | | Length: | 59 in. |
| Steel tube | 120 | steel | OD: | 2 in. |
| | | | Wall: | ⅛ in. |
| | | | Length: | 57 in. |
| Structural member | 106 | U shaped bar stock | Base width: | 1¼ in. |
| | | | Sidewall: | ½ in. |
| | | | Thickness: | ⅛ in. |
| Cross brace | 152 | U shaped bar stock | Base width: | 1¼ in. |
| | | | Sidewall: | ½ in. |
| | | | Thickness: | ⅛ in. |
| | | | Length | 14 in. |
| Cross brace | 110 | Hollow rectangular shaped bar stock | Height: | 1½ in. |
| | | | Width: | 1½ in. |
| | | | Thickness: | 3/32 in. |
| | | | Length | 14 in. |
| Cross brace | 111 | Hollow rectangular shaped bar stock | Height: | 1½ in. |
| | | | Width: | 1½ in. |
| | | | Thickness: | 3/32 in. |
| | | | Length | 14 in. |
| Tongue part | 114 | Hollow rectangular shaped bar stock | Height: | 1½ in. |
| | | | Width: | 1½ in. |
| | | | Thickness: | 3/32 in. |
| | | | Length | 7.5 in. |
| Tongue part | 116 | Hollow rectangular shaped bar stock | Height: | 1½ in. |
| | | | Width: | 1½ in. |
| | | | Thickness: | 3/32 in. |
| | | | Length | 24.5 in. |
| Tongue part | 118 | Hollow rectangular shaped bar | Height: | 1½ in. |
| | | | Width: | 1½ in. |
| | | | Thickness: | 3/32 in. |

-continued

| Item | number | material | dimensions | |
|---|---|---|---|---|
| | | stock | Length | 8 in. |
| Insertion members | 128 | Hollow rectangular shaped bar stock | Height: | 1¼ in. |
| | | | Width: | 1¼ in. |
| | | | Thickness: | 3/32 in. |
| | | | Length | 6 in. |

While the above material dimensions and specifications produced a successful model, other models may be constructed of different materials and dimensions within the scope of the invention.

The invention may be embodied in other specific forms without departing from the spirit or essential characteristics thereof. The present embodiment is therefore, to be considered in all respects as illustrative and not restrictive, the scope of the invention being indicated by the appended claims rather than by the foregoing description, and all changes which some within the meaning and range of equivalency of the claims are therefore to be embraced therein.

What is claimed and desired to be secured by Letters Patent is:

1. A manually manipulable jet ski ground and vehicle supported transport carriage for a loading and unloading into a bed of a pick-up truck the combination of the carriage and a jet ski superimosed thereon by one person, safe and stable hauling of the combination from a shoreline site, unloading and subsequent displacement of the combination from the shoreline site to water's edge, detachment of the jet ski from the carriage into water and reattachment thereat, the jet ski transport carriage comprising framework means comprising longitudinally-directed members having a length less than that of said pick-up truck bed and a width no greater than one half that of said pick-up truck bed, the longitudinally-directed members comprising means sized, shaped, and laterally spaced to matingly receive and essentially contiguously support in a superimposed, stable relationship, the jet ski thereon, lateral support members interconnecting with the longitudinally-directed members in load transferring relationship and support means interposed between the framework means and a support surface including the bed of the pick-up whereby said load is transferred through the support means, said support means comprising means removably interconnecting the support means to the lateral support members.

2. The jet ski carriage according to claim 1 wherein the longitudinally-directed members comprise two spaced parallel tubular rail members upon which curved surfaces of the jet ski gravitionally rest.

3. The jet ski carriage according to claim 2 wherein the two tubular members include tubing comprised of synthetic resinous material.

4. The jet ski carriage according to claim 3 wherein the synthetic resinous tubing is internally reinforced by metallic tubing rigidly connected by fastener means to the longitudinally-directed members.

5. The jet ski carriage accroding to claim 1 wherein the lateral support members include at least two cross braces each comprising recess means at two exposed ends thereof.

6. The jet ski carriage to claim 5 wherein the support means comprise means received and releasably retained in said recess means.

7. The jet ski carriage according to claim 6 further comprising removable fastner means removably connecting the removable interconnecting means.

8. The jet ski carriage according to claim 1 wherein the framework means further comprise tongue means, said tongue means being configurated to be congruent with and to contiguously engage bow means of the jet ski.

9. The jet ski carriage according to claim 8 wherein the tongue means comprise coupling means for releasably connecting the bow means of the ski jet to the framework means.

10. The jet ski carriage according to claim 9 wherein the coupling means comprises a clevis.

11. The jet ski carriage according to claim 1 wherein the support means comprise wheel means.

12. The jet ski carriage according to claim 11 wherein the wheel means comprises caster means.

13. The jet ski carriage according to claim 1 wherein the support means comprises means.

14. The jet ski carriage according to claim 1 wherein said support means comprises horizontally-directed beam means manually removably interconnected to lateral support members adapted to rest by force of gravity upon rear wheel well means of the pick up truck.

15. The jet ski carriage according to claim 1 wherein said support means comprises vertically-directed column means manually removably interconnected to lateral support members adapted to rest upon the bed of the pickup truck so as to cause the carriage to be essentially horizontal.

16. The jet ski carriage according to claim 15 further comprising two jet ski carriages adpated to be disposed in side-by-side relation in the bed of the pick-up truck, each carriage including support means comprising horizontally-directed beam means adapted, to rest upon rear wheel well means and additional beam means releasably interposed between aligned lateral support members of the two jet ski carriages.

17. The jet ski carriage according to claim 16 wherein the support means of each carriage comprise manually removable vertically-directed column means.

18. The jet ski carriage according to claim 14 wherein the beam means and the framework means are manually removably telescopically interrrelated.

19. The jet ski carriage according to claim 18 further comprising fastener means releasably uniting the beam means and the framework means, the fastener means comprising pin means seletively placed in aligned aperture means in the beam means and the framework means.

20. A jet ski according to claim 1 wherein the support means comprise column means.

21. The jet ski carriage according to claim 20 wherein the column means and the framework means are manually removably telescopically iterrealated.

22. The jet ski carriage according to claim 21 wherein beam means and the framework means include alignable aperture means and further having manually removable fastener means comprising pin means placed in the alignable aperture means to releasably hold the beam means and the framework means in secure transportable relation.

23. The jet ski carriage according to claim 1 further comprising releasably connecting means adapted to be interposed between the carriage and a back of the jet ski.

24. A method of safely and stably loading a jet ski upon a carriage for manual manipulation of the combination by one person comprising the steps of:
manually wheeling the carriage to a site where the jet ski is located;
manually manipulating the jet ski until the jet ski is superimposed contiguously in stable relationship above the carriage in such a way that the contiguous relationship is congruent;
releasably connecting the jet ski to the carriage;
manually unitarily wheeling the combined connected jet ski/carriage combination to a vehicle site;
manually loading the combination upon a bed of the vehicle;
dewheeling the carriage and interposing static supports between the carriage and the bed.

25. A method according to claim 24 wherein the manually manipulating step comprises one man manually placing the jet ski upon the carriage.

26. A method according to claim 24 wherein the manually manipulating step comprises manual lifting and sliding of the jet ski upon the carriage.

27. A method according to claim 24 wherein the manually manipulating step comprises floatation of the jet ski into a position in water above the carriage.

28. A method according to claim 24 wherein the manually manipulating step comprises placing the jet ski on rails of the carriage.

29. A method according to claim 24 wherein the releasably connecting step comprises latching the front of the jet ski to the carriage.

30. A method according to claim 24 wherein the releasably connecting step comprises latching the rear of the jet ski to the carriage.

31. A method according to claim 24 wherein the manually unitarily wheeling step comprises pulling the combination along upon carriage wheel means.

32. A method according to claim 24 wherein the manually unitarily wheeling step comprises pushing the combination along a surface upon carriage wheel means.

33. A method according to claim 24 wherein the manually loading step comprises one man manually lifting and sliding of the combination into the vehicle bed.

34. A method according to claim 24 further comprising manually removing the combination from the bed of the vehicle adjacent to a shoreline and placing the combination at water's edge.

35. A method according to claim 24 wherein the manually loading step comprises securing the combination in the bed of the vehicle against substantial relative movement.

36. A method according to claim 24 further comprising the steps of manually removing the combination from the bed of the vehicle adjacent to a shoreline, placing the combination in water and selectively disconnecting and separating the jet ski from the carriage and floating the jet ski from the carriage.

37. In combination, a jet ski and a jet ski carriage for manual loading into and unloading out of a bed of a vehicle as a unit, the bed having a length and a width:
the jet ski having a width and comprising a leading end, a trailing end and a bottom, the bottom comprising longitudinally-extending exterior concave surface means, the jet ski resting gravitationally upon the carriage;

the jet ski carriage having a width similar to the width of the jet ski and substanially less than the width of the bed, a length less than the length of the bed and including framework means comprising spaced longitudinally-directed convex members matingly contiguously engaging the exterior concave surface means of the jet ski in stable relationship;

laterally-directed spaced support members interconnected to the longitudinally-directed members in load transferring relation and support means manually removably carried by the framework means so as to be interposed in load transferring relation between the framework means and the bed.

38. A method manually uniting, unitarily transporting and disuniting a jet ski and a jet ski carriage practicable by one person, comprsing the steps of:

manually displacing the jet ski over the jet ski carriage unit longitudinally-extending bottom grooves of the jet ski are contiguously and co-extensively superimposed over spaced cylindrically-shaped longitudinal members of the jet ski carriage in safe and stable load transferring relation;

manually wheeling the jet ski carriage and the jet ski superimposed thereon, as a combination, to a vehicle site;

manually loading the combination as a unit at the vehicle site causing the combination to rest in a safe and stable condition upon a bed of a vehicle;

transporting the combination in the bed of the vehicle in a safe and stable condition from the vehicle to a launch site adjacent to a water shoreline;

manually unloading the combination from the bed of the vehicle to a ground engaging position at the launch site;

manually wheeling the combination from an unloaded ground engaging position to the water edge;

placing the combination in the water;

separating the jet ski from the jet ski carriage in the water adjacent to the shoreline and launching the jet ski.

39. A method according to claim 38 wherein the manually loading step comprises lifting and sliding the combination by one person.

40. A method according to claim 38 wherein the manually unloading step comprises lifting and sliding the combination by one person.

41. A method according to claim 38 wherein the separating step comprises flotation of the jet ski away from the jet ski carriage.

42. A method according to claim 38 further comprising the steps of dewheeeling and statically supporting the combination while in the bed of the vehicle.

43. A method according to claim 38 further comprising the step of storing the combination for a period of time at a storage site after the manually displacing step and before the first manually wheeling step.

44. A method of manually uniting, unitarily transporting and disuniting a jet ski and a jet ski carriage practicable by one person, comprising the steps of:

displacing the jet ski independently across water to a shoreline site;

manually placing the jet ski in stable superimposed relationship upon the carriage at a water's edge so that longitudinally-extending grooves of the jet ski are contiguously and co-extensively superimposed over spaced cylindrically-shaped longitudinal members of the jet ski carriage;

manually wheeling the combination of the jet ski and superimposed jet ski carriage from the water's edge to a vehicle having a bed;

manually loading the combination as a unit causing the combination to rest in a safe and stable condition upon the bed of the vehicle;

transporting the combination in the bed of the vehicle in a safe and stable condition from the vehicle loading site to an unloading site;

manually unloading the combination from the bed of the vehicle to a ground-engaging position at the unloading site;

manually wheeling the combination from the unloaded ground engaging position to a jet ski storage site.

45. A method according to claim 44 further comprising the step of storing the combination at the storage site.

46. A method according to claim 44 wherein the manually loading step comprises lifting and sliding the combination by one person.

47. A method according to claim 44 wherein the manually unloading step comprises lifting and sliding the combination by one person.

48. A method according to claim 44 further comprising the steps of dewheeling and statically supporting the combination while in the bed of the vehicle.

* * * * *